United States Patent [19]

Stog

[11] Patent Number: 5,294,340

[45] Date of Patent: Mar. 15, 1994

[54] PROCESS FOR THE BIOLOGICAL TREATMENT OF WASTE WATER USING MICROORGANISMS

[75] Inventor: Jochen Stog, Waltrop, Fed. Rep. of Germany

[73] Assignee: J. Stog Tec GmbH, Waltrop, Fed. Rep. of Germany

[21] Appl. No.: 768,191

[22] PCT Filed: Mar. 21, 1990

[86] PCT No.: PCT/DE90/00214

§ 371 Date: Nov. 15, 1991

§ 102(e) Date: Nov. 15, 1991

[87] PCT Pub. No.: WO90/11971

PCT Pub. Date: Oct. 18, 1990

[30] Foreign Application Priority Data

Apr. 11, 1989 [DE] Fed. Rep. of Germany ....... 3911789

[51] Int. Cl.$^5$ ............................................. C02F 3/02
[52] U.S. Cl. ........................................ 210/610; 210/615; 210/621; 210/150; 210/170; 210/194; 261/77; 261/122.1
[58] Field of Search ............... 210/610, 611, 607, 615, 210/620, 621, 629, 150, 151, 170, 194, 220, 747; 261/77, 121.1, 122, 123, DIG. 75

[56] References Cited

U.S. PATENT DOCUMENTS

| | | | |
|---|---|---|---|
| 2,822,329 | 2/1958 | Griffith | 210/629 |
| 3,371,033 | 2/1968 | Simmons et al. | 210/615 |
| 3,671,022 | 6/1972 | Laird et al. | 210/170 |
| 4,039,437 | 8/1977 | Smith et al. | 210/170 |
| 4,148,726 | 4/1979 | Smith | 210/170 |
| 4,347,143 | 8/1982 | Righetti | 210/194 |
| 4,350,589 | 9/1982 | Stog | 210/242.2 |
| 4,514,343 | 4/1985 | Cramer et al. | 210/242.2 |

FOREIGN PATENT DOCUMENTS

| | | |
|---|---|---|
| 455656 | 7/1968 | Fed. Rep. of Germany . |
| 2523591 | 4/1976 | Fed. Rep. of Germany . |
| 60-216898 | 10/1985 | Japan . |
| 587400 | 4/1947 | United Kingdom . |

Primary Examiner—Christopher Upton
Attorney, Agent, or Firm—James Creighton Wray

[57] ABSTRACT

The present invention relates to the biological treatment of waste water using microorganisms whose living conditions are maintained by addition of oxygen into a contact path. An underwater support frame has a double-walled duct arranged as a contact path such that the duct is placed angularly towards a surface of the water. The duct is made for holding air bubbles to prevent the premature rise of the air bubbles added by an aerator providing air at the beginning of the contact path. The contact path has a suction point at an end which is connected via a fresh organism pipe with the aerator. A connection piece connects the aerator to a suction pipe at the beginning of the contact path. The other end of the suction pipe is connected to a flowing-in opening located at a distance from the aerator contrary to the flow direction, for supplying contaminated water to the aerator before the water actually reaches the contact path.

12 Claims, 2 Drawing Sheets

PROCESS FOR THE BIOLOGICAL TREATMENT OF WASTE WATER USING MICROORGANISMS

BACKGROUND OF THE INVENTION

This invention relates to a process for the biological treatment of waste water using microorganisms whose living conditions are maintained by the addition of oxygen into a contact path which is arranged at a slight upward angle towards the water surface and has an interior air-permeable and an exterior air-impermeable wall, whereby air and contaminated waste water are added into the contact path for the development of the microorganisms approximately parallel to the water surface. The invention also relates to a device for implementing the process which has an underwater support frame in which a double-walled duct is arranged with a slight rise towards the water surface and holds the air bubbles and which has installations which prevent the premature rise of the latter and which in its capacity as contact path holds the contaminated waste water which was added via an aerator and the air.

Such processes are used for the biological decontamination of waste waters and especially for the regeneration of waters which are seriously contaminated and silted because of a lack of oxygen. A known device used for this purpose (German Patent 2523591) has a water jet pump which is used to produce a water-air mixture which is then passed for a certain time period in a pipe in such a way that the air bubbles do not rise too fast. The pipe is extended so far and is equipped with an air-permeable interior wall and an air-impermeable exterior wall that the individual air bubbles which are as small as possible must travel long distances and are, during this time, in intensive contact with the water. In this way oxygen-saturated water is obtained in a certain area so that the bacteria eliminating the sludge are preserved or are able to multiply as quick as possible. The device stands with its support frame on the bottom of the water and may, if needed, be transported from one location to another. In order to ensure the necessary contact of the air bubbles with the water, such contact paths have a length of 15 m or more. Inside of the contact paths are installations at which the individual microorganisms may also settle and develop in order to ensure the shortest possible and complete purification of the water. But the disadvantage is that the microorganisms develop more or less randomly depending on oxygen and food supply, i.e. the added contaminations. In addition, the microorganisms which have just achieved optimum effectiveness are removed with the purified waste water, something which is partially desired, but which on the other hand constitutes an overall impediment of the even development of microorganisms. This causes problems particularly when the composition of the waste water changes. Then, either not enough microorganisms are present, or the present microorganisms cannot change, or the currently required microorganisms are available only in small or minute numbers. British application 587 400 publishes a process for waste water treatment in a contact path which is simply aerated cross-wise to flow direction. Part of the microorganisms leaving the contact path are recycled together with absorbed sludge into the contact path. Notwithstanding the fact that this achieves only an insufficient aeration, i.e. supply of oxygen, the suggestion of the recycling of sludge obviously shows that only a small purification result may be presupposed.

SUMMARY OF THE INVENTION

The invention is based on the task of creating a waste water treatment process with a permanent comparably good purification result which is able to additionally adapt without great expenditure and in a short time to greatly changing waste water compositions. The invention shall also describe a device required for implementing the invented process.

According to the invention the task is solved in that part of the microorganisms which have developed in the contaminated water and are leaving the contact path are specifically caught and recycled to the contact path and that in addition a small partial stream of the contaminated waste water is given in advance as a kind of indicator into the settlement area of the microorganisms in the contact path.

In the present process especially those microorganisms which no longer find a sufficient food supply in the purified water are recycled and thus they are best suited for further elimination of contaminants and also for further development of the necessary types of microorganism. In addition, the microorganisms are able to develop in the contaminated water according to its properties so that mostly those types are present which are required for optimized biological waste water treatment when the contaminated water reaches the contact path. Such a targeted process implementation and treatment of the microorganisms is able to advantageously shorten the process itself since healthy microorganisms best suited for the respective purification may be made available in a sufficient volume.

Also taken into consideration is the fact that the living conditions for the microorganisms may change significantly depending on the degree of contamination and type of contamination of the waste water. The early introduction of small quantities of the waste water from a source being fed to the contact path which constitutes a kind of early warning system prevents a sudden destruction of the microorganisms or failure of the purification. The small partial stream of the waste water remains totally unaffected, if the waste water may be purified by the existing microorganisms. But in the presence of a different contamination or different composition of the waste water this small partial stream already precultivates the microorganisms suitable for the former so that they develop rapidly when the waste water with the changed composition arrives at the contact path, and ensure that the purification of the overall waste water continues to be guaranteed also. This advantageously enables a smooth transition without requiring special measures. The fact is that the adaptation is an entirely automatic result caused by the indicator.

According to a useful version of the invention it is provided that the microorganisms are recycled into the contact path in the counterstream. The microorganisms which otherwise would no longer find the sufficient food supply in the purified water and would thus die are now evenly distributed in the contact path in such a way that they are once again able to feed and propagate optimally. This is caused by their introduction into the counterstream which ensures the even distribution of the microorganisms.

Another possibility of even distribution of the microorganisms consists of taking in the partial stream of the microorganisms at a predetermined distance in flow direction behind the introduction point of the air and to then distribute it together with the air and water in the contact path. The microorganisms thus would be introduced either in the area of the water jet pump or a little behind it so that they are flushed together with the fresh waste water stream in which the large volume of air bubbles are also introduced into the area of the contact path. In the process it is tolerated that the water here is not yet enriched with oxygen so that the method described earlier is actually the better one according to which the microorganisms are introduced into the contact path in the counterstream at a certain distance to the introduction point, i.e. to the aerator.

The number of microorganisms and their formation as such depends essentially on the oxygen saturation of the water. Because of this a particularly beneficial removal of the microorganisms should be performed at a certain distance and the quantity should also be varied accordingly, whereby it is provided according to the invention that the suction point is shifted in or contrary to the flow direction depending on the oxygen saturation of the water and the quantity of present microorganisms.

As a rule it will be sufficient if the partial stream of the contaminated waste water is introduced at a certain point into the settlement area of the microorganisms. Then, if a possible quick distribution becomes necessary or if the change in the water is very decisive and has been preestablished by way of third measures it may be advantageous to introduce the partial stream together with air and waste water into the contact path if the composition of the waste water is such that it may threaten the microorganisms in their entirety. This accelerates adaptation, in particular if according to another advantageous version of this process the quantity of the partial stream is increased. This prepares a continuous promotion and growth of those microorganisms needed at the arrival of the waste before the waste water with the changing composition actually reaches the tank.

Another possibility of adaptation of microorganism development consists of reducing the addition of contaminated waste water and simultaneously locating the suction point closer to the introduction point of air and contaminated waste water. The changing composition of the waste water may be taken into consideration in this way, in particular if the already considered contamination becomes stronger than before, whereby the invented process ensures that the same purification result is obtained.

In the case of especially grave changes in the composition of the waste water it may be advantageous to sluice into the cycle via the suction point precultivated microorganisms which are adapted to the new waste water composition until a stabilization is again obtained. However, this process variation requires continuous observation and control of the waste water in order to be able to introduce the specifically cultivated microorganisms at the right time, i.e. at a time when they are really needed and when they are then also found again at the suction point and are then recycled again, potentially with further precultivated microorganisms, into the cycle.

For the implementation of the invention we provide a device which achieves recycling of the cultivated microorganisms into the cycle by locating a suction point behind the contact path in flow direction, said suction point being connected with the aerator via a fresh organism pipe. The microorganisms which are optimized for subsequent cultivation or water purification are thus collected via the suction point and are then returned through the fresh organism pipe into the aerator or to the aerator. In the process the suction of the aerator may be exploited in order to use it to catch or take in the microorganisms and to introduce them again into the contact path.

The introduction of the small partial stream of waste water into the area of the aerator ensures permanent operation. In the process the openings for streaming in and thus the length of the suction pipe are so long that a sufficient time span is given for precultivating the microorganisms for the corresponding changing waste water.

A specific recycling of the microorganisms, however, is ensured in that the suction point is equipped with a vacuum pump and on the discharge side with a large number of discharge nozzles which operate in counterstream direction. Such a construction ensures both the taking in of exactly those microorganisms necessary for further cultivation and also their even application over the entire cross-section of the contact path, whereby discharge nozzles here have the actual meaning of openings which ensure that the microorganisms are mixed in the counterstream at least for a short distance with the supplied waste water which is saturated with oxygen.

The even taking-in of the water mixed with the microorganisms is optimized in that the suction point has a large number of suction pipes which are distributed over a large diameter.

The locating of the suction point exactly in the area where it catches microorganisms, and particularly healthy microorganisms, is ensured advantageously in that the fresh organism pipe is constructed in telescope construction and has a drive. The telescope pipe may be pushed together and apart via the drive in order to locate the suction point in the respectively correct area.

Optimum security against changing waste water is achieved according to the invention in that the length of the suction pipe is chosen depending on the average growth speed of anaerobic microorganism present in activated sludge.

The invention is particularly characterized in that it creates a process and also a device which is able to systematize biological waste water treatment to such an extent that an even purification result is ensured even if the waste water changes in volume of contamination or type of contamination. Specific cultivation of especially those microorganisms able to deal with the waste water problems and their early settlement in the area of the aerator and contact path ensures a continuous permanent operation of a corresponding device and provides the powerful even purification result.

Other details and advantages of the object of the invention result from the following description of the corresponding drawing which shows a preferred example with the necessary details and individual parts.

DETAILED DESCRIPTION OF THE DRAWINGS

Figure 1:
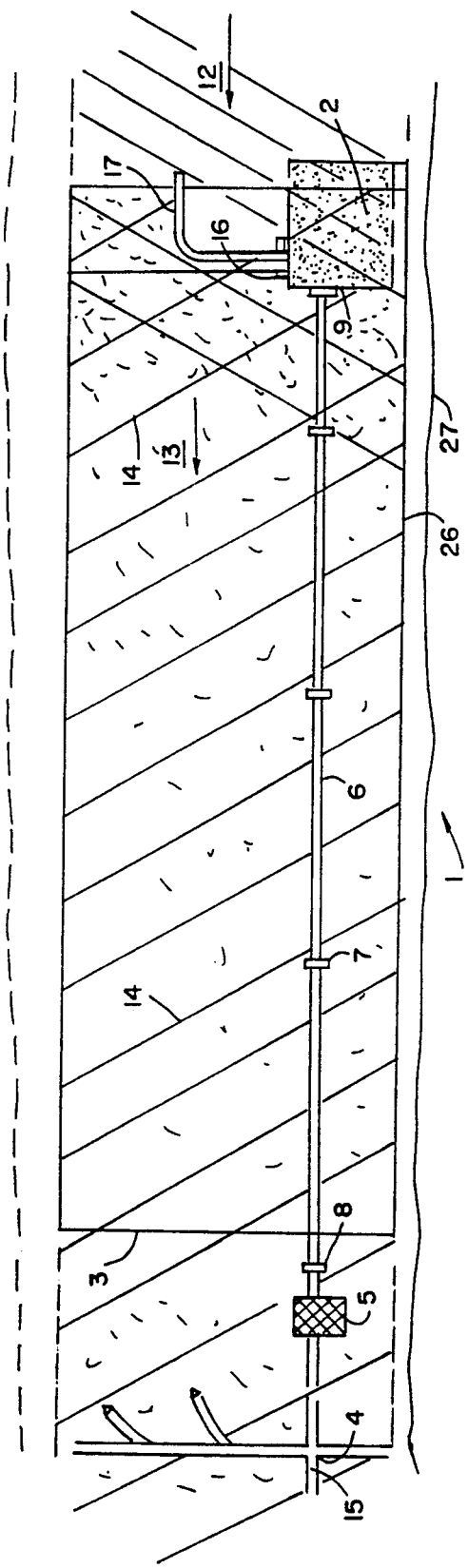
FIG. 1 shows a simplified portrayal of a contact path for waste water treatment.
Figure 3:
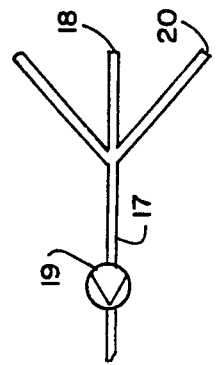
FIG. 3 shows the suction pipe for the indicator water volume.

FIG. 1 shows a simplified portrayal of a contact path, whereby this contact path (1) is shown here in a simplified manner with only one wall 26. However, the structure may also have a double wall, as partially indicated at 27. The aerator (2) is located at the beginning of the path; at the end of the path is located the suction point (4) through which the approximately or entirely developed microorganisms are taken in and are returned in the area of the aerator (2). For this purpose the suction point has a vacuum pump (5) and is connected via the fresh organism pipe (6) with the aerator (2).

In order to be able to locate the suction point (4) always at the various positions, the connections between the individual fresh organism pipe pieces (6) are constructed as telescopic connections (7, 8). In this way the pipe (6) may be pushed together or apart respectively, depending on which distance the suction point (4) is supposed to have from the aerator (2). A motor drive may be provided here in order to be able to perform the telescoping from the water surface or a floating platform.

Figure 2:
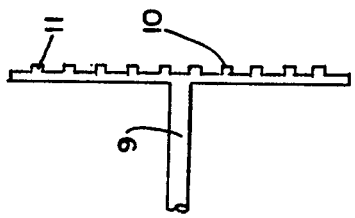
FIG. 2 shows the portrayal of the distributor pipe for recycling the microorganisms.

The end of the fresh organism pipe (6) is formed by a distributor pipe (9) which is shown in detail in FIG. 2. The distributor pipe (9) is equipped here with a large number of discharge nozzles (10, 11) in order to eject the purified water which contains a multitude of healthy microorganisms evenly distributed over a correspondingly large diameter, i.e. in the counterstream to the introduced waste water undergoing purification. The discharge nozzles (10, 11) are principally simple openings or bores which are located contrary to the flow direction.

The waste water flowing into the contact path (1) is designated with (12), whereby the increasing degree of purification within the contact path (1) is indicated by the fact that the distance between the lines which run at an angle from the top to the bottom becomes increasingly greater. (13) designates the oxygen-saturated water which because of its consumption by the microorganisms reduces its oxygen content somewhat behind the aerator (2) through blowing in of air. This is also indicated in that the density of the dots decreases from the beginning to the end of the path (3). Lines, in this case running from the bottom to the upper left at an angle, are also used to indicate the growth area (14) of the microorganisms. According to the increasing volume of microorganisms the interval between the lines which run from the bottom right to the upper left becomes closer.

The suction pipe (15) is located approximately in the area which is optimally enriched with microorganisms, said suction pipe having several openings in order to be able to remove the microorganism-enriched water also from different areas. The individual openings may be equipped with slides so that water with microorganisms may be removed specifically from different horizons.

Also in the area of the aerator (2) a suction pipe (17) is connected via a connection piece (16). Through this suction pipe dirt water or waste water which has been taken in well away from the area in front of the contact path (1) is added in a small quantity into the settlement area of the microorganisms in order to ensure an early warning in this way. I.e., if the composition of the waste water to be purified changes, a reorientation in development will occur simultaneously in the settlement area of the microorganisms since the corresponding waste water is made available here. According to FIG. 1 a direct introduction of this small stream of dirt water into the aerator is provided via the connection piece (16), but the suction pipe is also able to discharge to the top or bottom edge of the contact path (1).

The suction pipe (17) ends far from the contact path (1) and ends in several flowing-in openings (18, 20). Pipe 17 is connected near the end to a pump (19) which enables a small predetermined quantity of the dirt water to be drawn in through the openings (18, 20) and supplied via pipe 17 to the beginning of the contact path having the growth area of the microorganisms.

Figure 4:
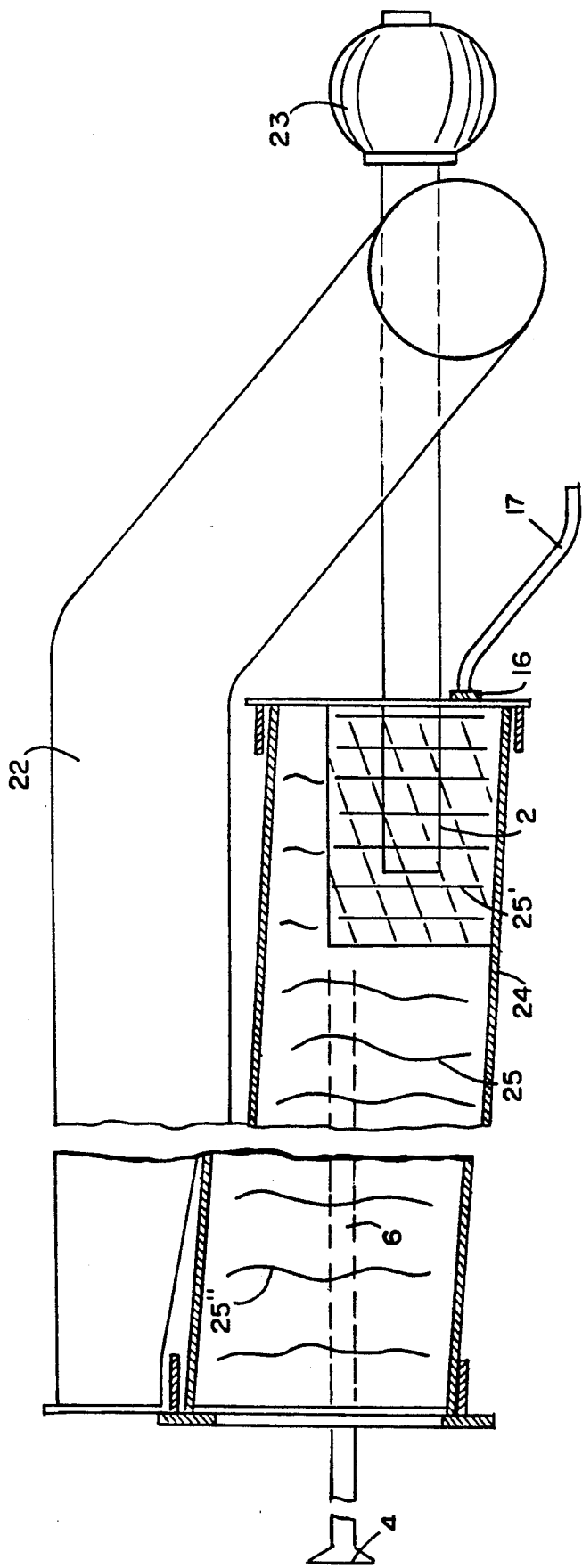
FIG. 4 shows an enlarged portrayal of a device suitable for implementing the process.

FIG. 4 finally shows another simplified construction of a device for implementing the invented process, whereby here it is also clarified that the contact path (1) in the form of a plexiglass pipe (24) is coordinated with an underwater support frame (22) through which the distance of the plexiglass pipe (24) to the water surface is adjusted accurately for each case and maintained thereof. Dirt water is taken in via the water jet pump (23) and simultaneously air is introduced through the nozzles so that a water-air mixture already flows into the area of the plexiglass pipe (24) via the aerator (2). In order to prevent the air bubbles from rising and on the other hand to provide surfaces for the microorganisms to settle on, a large number of installations (25) are provided in the plexiglass pipe (24), whereby many different constructions are possible for this purpose. The plexiglass pipe (24), i.e. the contact path (1) runs at a slight angle to the water surface, whereby the second wall is also absent here because the installations (25) provide sufficient safeguards to prevent the premature rising of the air bubbles. The construction as a plexiglass pipe (24) additionally has the great advantage that the light required for the growth of the microorganisms is made available in a sufficient volume.

In case of the fresh organism pipe (6) indicated in FIG. 4, the suction point (4) portrayed simply as a connection piece, suctions water containing the microorganisms for recycling into the area of the aerator (2). The volume of water to be suctioned can be determined exactly by the choice of the diameter of the fresh organism pipe (6), the pump and its setting as such.

The installations (25) shown in FIG. 4 are a type of plastic ropes on which the microorganisms may settle. But these installations (25, 25', 25") may also, as already mentioned, take other forms, whereby it is useful to use such installations (25, 25', 25") which provide large surfaces on which the air bubbles and microorganisms may settle.

I claim:

1. A process for the biological treatment of waste water, using microorganisms whose living conditions are maintained by addition of oxygen into a contact path, the contact path being arranged at a slight upward angle towards a surface of the water and having an interior air-permeable and an exterior air-impermeable wall, comprising the steps of:
   adding air and contaminated waste water into a beginning of the contact path for developing the microorganisms approximately parallel to the surface of the water;
   trapping and suctioning a part of the microorganisms developed in the contaminated water at a predetermined distance near an end of the contact path by means of a telescopable fresh organism pipe;

recycling the trapped microorganisms to the beginning of the contact path and additionally introducing a partial stream of the contaminated waste water from a source of the waste water into a settlement area of the microorganisms in the beginning of the contact path to prepare the microorganisms for any change that would occur in the contamination of the waste water being flown to the contact path.

2. The process of claim 1, wherein the recycling comprises recycling a part of the microorganisms suctioned, to the beginning of the contact path against a direction of flow of the waste water.

3. The process of claim 1, wherein the trapping comprises suctioning part of the microorganisms at a predetermined distance in a direction of flow near an end of the contact path, and the recycling comprises distributing the trapped microorganisms together with air and the water in the contact path.

4. The process of claim 3, wherein further addition of contaminated waste water is decreased when the suction point is located closer to the beginning of the contact path where the air and the contaminated waste water are introduced.

5. The process of claim 1, wherein the suctioning comprises selecting a distance depending on a saturation of the oxygen in the water and on a volume of the microorganisms present in the contact path for suctioning an optimal part of the microorganisms and supplying to a source of the contaminated waste water.

6. The process of claim 1, further wherein introducing the partial stream comprises introducing air and waste water into the beginning of the contact path for reacting the waste water introduced with the recycled microorganisms in their entirety.

7. The process of claim 1, wherein the prepared microorganisms are precultivated for adapting to the new waste water composition and are sluiced into the contact path via a suction point until a stabilization has been achieved.

8. An Apparatus for the biological treatment of waste water using microorganisms whose living conditions are maintained by addition of oxygen into a contact path, comprising an underwater support frame in which a double-walled duct is arranged as a contact path such that the duct is placed angularly towards a surface of the water, and the duct having means for holding air bubbles to prevent the premature rise of the air bubbles and holds the contaminated waste water added by means of an aerator providing air at a beginning of the contact path, a suction point at an end of the contact path, the suction point being connected via a telescopable fresh organism pipe with the aerator, a connection piece for connecting the aerator to a suction pipe at the beginning of the contact path, the suction pipe having a diameter at one end smaller than that of another end, and the other end of the suction pipe being connected to a flowing-in opening located at a distance from the aerator contrary to the flow direction, for supplying contaminated water to the aerator before the water actually reaches the contact path.

9. The apparatus of claim 8, wherein the suction point is connected to plural inlet pipes arranged to cover a large diameter within the contact path.

10. The apparatus of claim 8, wherein the length of the suction pipe is proportional to cover an average growth speed of the microorganisms present in activated sludge.

11. An Apparatus for the biological treatment of waste water using microorganisms whose living conditions are maintained by addition of oxygen into a contact path, comprising an underwater support frame in which a double-walled duct is arranged as a contact path such that the duct is placed angularly towards a surface of the water, and the duct having means for holding air bubbles to prevent the premature rise of the air bubbles and holds the contaminated waste water added by means of an aerator providing air at a beginning of the contact path, a suction point at an end of the contact path, the suction point being connected via a fresh organism pipe with the aerator, a connection piece for connecting the aerator to a suction pipe at the beginning of the contact path, the suction pipe having a diameter at one end smaller than that of another end, and the other end of the suction pipe being connected to a flowing-in opening located at a distance from the aerator contrary to the flow direction, for supplying contaminated water to the aerator before the water actually reaches the contact path, wherein the suction point is equipped with a vacuum pump near the end of the contact path and with plural discharge nozzles for discharging the microorganisms in a couterstream direction at the beginning of the contact path.

12. An Apparatus for the biological treatment of waste water using microorganisms whose living conditions are maintained by addition of oxygen into a contact path, comprising an underwater support frame in which a double-walled duct is arranged as a contact path such that the duct is placed angularly towards a surface of the water, and the duct having means for holding air bubbles to prevent the premature rise of the air bubbles and holds the contaminated waste water added by means of an aerator providing air at a beginning of the contact path, a suction point at an end of the contact path, the suction point being connected via a fresh organism pipe with the aerator, a connection piece for connecting the aerator to a suction pipe at the beginning of the contact path, the suction pipe having a diameter at one end smaller than that of another end, and the other end of the suction pipe being connected to a flowing-in opening located at a distance form the aerator contrary to the flow direction, for supplying contaminated water to the aerator before the water actually reaches the contact path, wherein the fresh organism pipe is constructed telescopically with a drive coordinated therewith.

* * * * *